United States Patent
Morisaki et al.

(10) Patent No.: US 12,536,833 B2
(45) Date of Patent: Jan. 27, 2026

(54) STORE MANAGEMENT SYSTEM, STORE MANAGEMENT METHOD, COMPUTER PROGRAM AND RECORDING MEDIUM

(71) Applicant: NEC Corporation, Tokyo (JP)

(72) Inventors: Mitsunori Morisaki, Tokyo (JP); Gen Shimizu, Tokyo (JP); Masamichi Tanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 464 days.

(21) Appl. No.: 17/619,797

(22) PCT Filed: Jun. 9, 2020

(86) PCT No.: PCT/JP2020/022688
§ 371 (c)(1),
(2) Date: Dec. 16, 2021

(87) PCT Pub. No.: WO2020/255795
PCT Pub. Date: Dec. 24, 2020

(65) Prior Publication Data
US 2022/0358788 A1 Nov. 10, 2022

(30) Foreign Application Priority Data
Jun. 19, 2019 (JP) .................................. 2019-113479

(51) Int. Cl.
*G06V 40/16* (2022.01)
*G06V 40/50* (2022.01)

(52) U.S. Cl.
CPC ............ *G06V 40/172* (2022.01); *G06V 40/53* (2022.01)

(58) Field of Classification Search
CPC .... G06V 40/172; G06V 40/53; G06V 40/161; G07C 9/30; G07G 1/12
See application file for complete search history.

(56) References Cited

U.S. PATENT DOCUMENTS

| 11,943,363 B2 * | 3/2024 | Sheets .................. H04L 9/3231 |
| 2016/0019417 A1 | 1/2016 | Kobayashi |

(Continued)

FOREIGN PATENT DOCUMENTS

| CN | 106355464 A | 1/2017 |
| CN | 109215254 A | 1/2019 |

(Continued)

OTHER PUBLICATIONS

International Search Report for PCT Application No. PCT/JP2020/022688, mailed on Jul. 14, 2020.

(Continued)

*Primary Examiner* — Xuemei G Chen
(74) *Attorney, Agent, or Firm* — Sughrue Mion, PLLC

(57) ABSTRACT

A store management system includes: an acquisition unit that obtains a face image of a customer from an imaging apparatus that captures the face image of the customer at a timing at which the customer intends at least one of to enter a store, to make payment, and to leave the store; a notification unit that notifies the customer that the face image is to be obtained or is obtained by the acquisition unit; and a permission unit that permits the customer at least one of to enter the store, to make payment, and to leave the store on (Continued)

condition that the face image is obtained by the acquisition unit and that the customer is notified by the notification unit. It is thus possible to suitably manage the customer's entrance into the store or the like.

7 Claims, 8 Drawing Sheets

(56) References Cited

U.S. PATENT DOCUMENTS

| | | | |
|---|---|---|---|
| 2016/0189162 A1* | 6/2016 | Taira | G06Q 30/01 |
| | | | 705/44 |
| 2018/0096353 A1* | 4/2018 | Matsui | G06F 18/22 |
| 2018/0293612 A1* | 10/2018 | Yuasa | G07G 1/01 |
| 2019/0057249 A1* | 2/2019 | Hayase | G06V 40/161 |
| 2019/0089702 A1* | 3/2019 | Bhatt | H04L 63/0884 |
| 2019/0122250 A1* | 4/2019 | Panigrahi | G06F 16/436 |
| 2019/0206171 A1 | 7/2019 | Sasaki et al. | |
| 2019/0272581 A1* | 9/2019 | Li | G07G 1/0054 |
| 2020/0074148 A1* | 3/2020 | Xu | G06F 18/214 |
| 2020/0250651 A1* | 8/2020 | Lee | G06Q 20/3223 |
| 2020/0380833 A1* | 12/2020 | Kamio | G07C 9/253 |
| 2021/0133755 A1* | 5/2021 | Shimizu | G06Q 20/3278 |
| 2021/0192191 A1* | 6/2021 | Shen | G06Q 10/105 |
| 2022/0215396 A1* | 7/2022 | Ueki | G06V 20/52 |
| 2022/0358788 A1 | 11/2022 | Morisaki et al. | |
| 2023/0222837 A1* | 7/2023 | Hayase | G06Q 20/40145 |
| | | | 382/118 |

FOREIGN PATENT DOCUMENTS

| | | |
|---|---|---|
| CN | 208351633 U | 1/2019 |
| JP | H06-086295 A | 3/1994 |
| JP | 2000-331157 A | 11/2000 |
| JP | 2008-004003 A | 1/2008 |
| JP | 2009-009231 A | 1/2009 |
| JP | 2010-136898 A | 6/2010 |
| JP | 2015-232791 A | 12/2015 |
| JP | 2016-021184 A | 2/2016 |
| JP | 2017-215737 A | 12/2017 |
| JP | 2018-166282 A | 10/2018 |
| JP | 2018-194901 A | 12/2018 |
| JP | 7533460 B2 | 8/2024 |
| WO | 2019/017439 A1 | 1/2019 |

OTHER PUBLICATIONS

Chinese Office Action for CN Application No. 2080045081.0, mailed on Feb. 18, 2023 with English Translation.
JP Office Action for JP Application No. 2024-122497, mailed on Apr. 15, 2025 with English Translation.

* cited by examiner

STORE MANAGEMENT SYSTEM, STORE MANAGEMENT METHOD, COMPUTER PROGRAM AND RECORDING MEDIUM

This application is a National Stage Entry of PCT/JP2020/022688 filed on Jun. 9, 2020, which claims priority from Japanese Patent Application 2019-113479 filed on Jun. 19, 2019, the contents of all of which are incorporated herein by reference, in their entirety.

TECHNICAL FIELD

The present invention relates to a store management system, a store management method, a computer program and a recording medium that manage a customer's entering into a store or the like.

BACKGROUND ART

A known system of this type performs face authentication of a customer, thereby to permit the customer to enter an unmanned store or the like. For example, Patent Literature 1 discloses a technique/technology in which a face image of a person who enters or leaves a store is captured or photographed, and when captured face data can be collated with those stored in advance, the person who is their customer is permitted to enter or leave the store.

In addition, Patent Literature 2 discloses a technique/technology in which when a user's face image does not match a face image for authentication, this user is registered as a suspicious person or the like and an entrance/exit gate remains locked. Patent Literature 3 discloses a technique/technology in which when a visitor's face image matches data on a customer on a blacklist stored in advance, information is outputted indicating that the customer on the blacklist has visited.

CITATION LIST

Patent Literature

Patent Literature 1: JP2009-009231A
Patent Literature 2: JP2017-215737A
Patent Literature 3: JP2010-136898A

SUMMARY OF INVENTION

Technical Problem

In the technique as described in Patent Literature 1, for example, for the purpose of enhancing security in an unmanned store, the face authentication (i.e., collation of the captured face image with the face image registered) is performed. However, in order to perform face authentication, it is necessary to prepare face data for collation in advance, and thus, a user is required to perform, for example, a member registration procedure that involves capturing/photographing a face image. Such a procedure is very troublesome for many users.

In view of the problems described above, it is therefore an example object of the present invention to provide a store management system, a store management method, a computer program, and a recording medium that are configured to suitably manage a customer's entering into a store or the like.

Solution to Problem

A store management system according to an example aspect of the present invention includes: an acquisition unit that obtains a face image of a customer from an imaging apparatus that captures the face image of the customer at a timing at which the customer intends at least one of to enter a store, to make payment, and to leave the store; a notification unit that notifies the customer that the face image is to be obtained or is obtained by the acquisition unit; and a permission unit that permits the customer at least one of to enter the store, to make payment, and to leave the store on condition that the face image is obtained by the acquisition unit and that the customer is notified by the notification unit.

A store management method according to an example aspect of the present invention includes: an acquisition step that obtains a face image of a customer from an imaging apparatus that captures the face image of the customer at a timing at which the customer intends at least one of to enter a store, to make payment, and to leave the store; a notification step that notifies the customer that the face image is to be obtained or is obtained by the acquisition step; and a permission step that permits the customer at least one of to enter the store, to make payment, and to leave the store on condition that the face image is obtained by the acquisition step and that the customer is notified by the notification step.

A computer program according to an example aspect of the present invention allows a computer to execute: an acquisition step that obtains a face image of a customer from an imaging apparatus that captures the face image of the customer at a timing at which the customer intends at least one of to enter a store, to make payment, and to leave the store; a notification step that notifies the customer that the face image is to be obtained or is obtained by the acquisition step; and a permission step that permits the customer at least one of to enter the store, to make payment, and to leave the store on condition that the face image is obtained by the acquisition step and that the customer is notified by the notification step.

A recording medium according to an example aspect of the present invention is a recording medium on which the computer program according to the example aspect described above is recorded.

Advantageous Effects of Invention

According to the store management system, the store management method, the computer program, and the recording medium in the respective example aspects described above, it is possible to suitably manage a customer's entering into a store or the like.

DESCRIPTION OF EXAMPLE EMBODIMENTS

Hereinafter, a store management system, a store management method, a computer program, and a recording medium according to example embodiments will be described with reference to the drawings.

First Example Embodiment

Firstly, a store management system according to a first example embodiment will be described with reference to FIG. 1 to FIG. 4. Although the form of a store managed in the store management system is not particularly limited, the technical effect of the present example embodiment is exhibited remarkably, for example, in an unmanned convenience store (or a convenience store open at night) or the like.

(Hardware Configuration)

Figure 1:
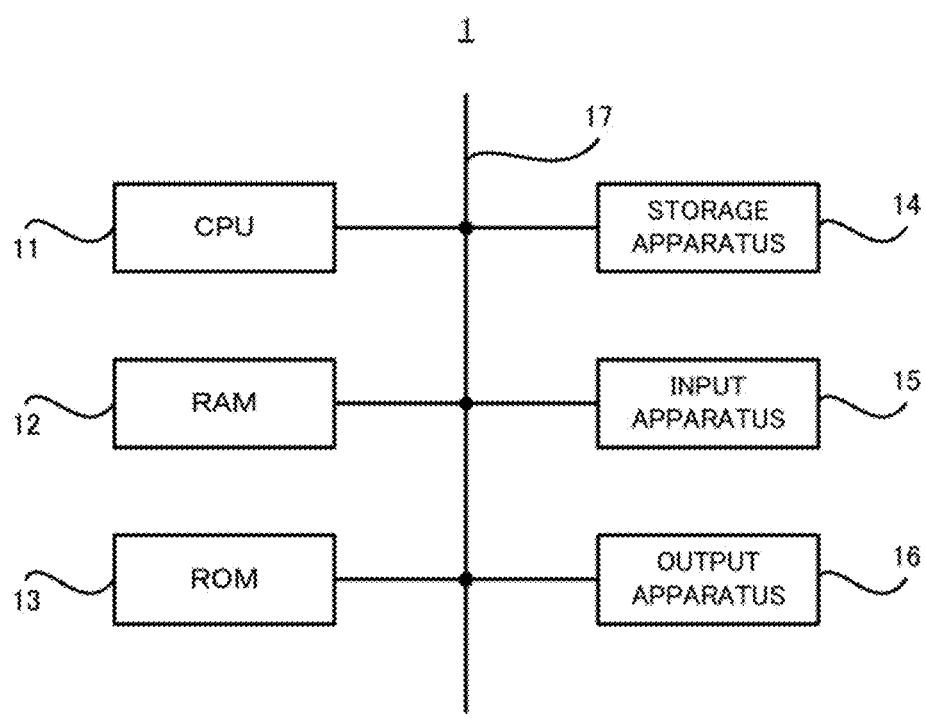
FIG. 1 is a block diagram illustrating a hardware configuration of a store management system according to a first example embodiment.

Firstly, a hardware configuration of the store management system according to the example embodiment will be described with reference to FIG. 1. FIG. 1 is a block diagram illustrating the hardware configuration of the store management system according to the first example embodiment.

As illustrated in FIG. 1, the store management system 1 according to the first example embodiment includes a CPU (Central Processing Unit) 11, a RAM (Random Access Memory) 12, a ROM (Read Only Memory) 13, a storage apparatus 14, an input apparatus 15, and an output apparatus 16. The CPU 11, the RAM 12, the ROM 13, the storage apparatus 14, the input apparatus 15, and the output apparatus 16 are connected through a data bus 17.

The CPU 11 reads a computer program. For example, the CPU 11 may read a computer program stored by at least one of the RAM 12, the ROM 13 and the storage apparatus 14. For example, the CPU 11 may read a computer program stored in a computer-readable recording medium, by using a not-illustrated recording medium reading apparatus. The CPU 11 may obtain (i.e., read) a computer program from a not illustrated apparatus located outside the store management system 1, through a network interface. The CPU 11 controls the RAM 12, the storage apparatus 14, the input apparatus 15, and the output apparatus 16 by executing the read computer program. Especially in the first example embodiment, when the CPU 11 executes the read computer program, a functional block for performing store management is implemented in the CPU 11. In other words, the CPU 11 is configured to function as a controller for performing store management.

The RAM 12 temporarily stores the computer program to be executed by the CPU 11. The RAM 12 temporarily stores the data that is temporarily used by the CPU 11 when the CPU 11 executes the computer program. The RAM 12 may be, for example, a D-RAM (Dynamic RAM).

The ROM 13 stores the computer program to be executed by the CPU 11. The ROM 13 may otherwise store fixed data. The ROM 13 may be, for example, a P-ROM (Programmable ROM).

The storage apparatus 14 stores the data that is stored for a long term by the store management system 1. The storage apparatus 14 may operate as a temporary storage apparatus of the CPU 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the store management system 1. The input apparatus 15 may include, for example, at least one of a keyboard, a mouse, and a touch panel.

The output apparatus 16 is an apparatus that outputs information about the store management system 1 to the outside. For example, the output apparatus 16 may be a display apparatus that is configured to display the information about the store management system 1.

(System Configuration)

Figure 2:
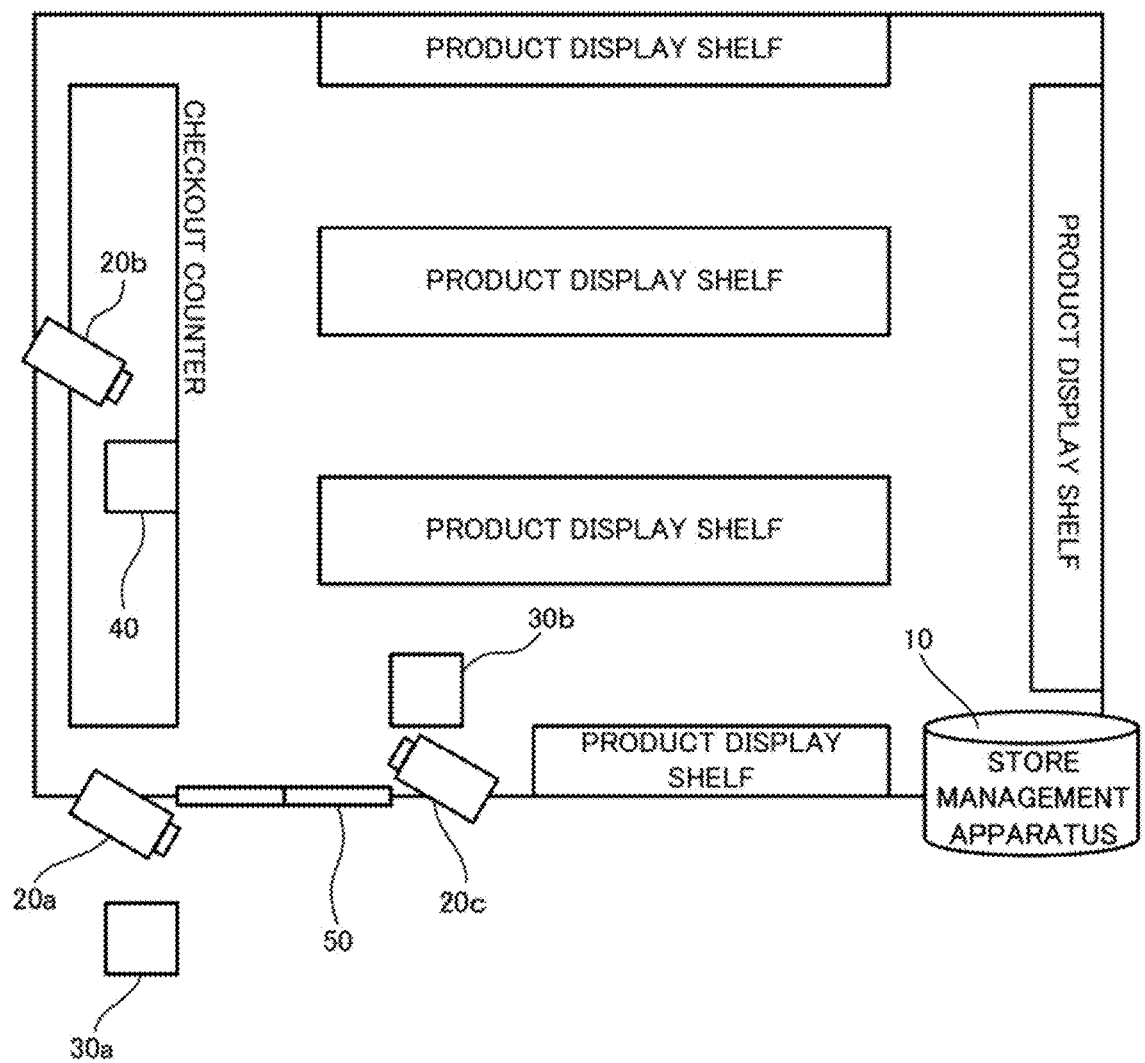
FIG. 2 is a plan view illustrating an example of a store layout to which the store management system according to the first example embodiment is applied.
Figure 3:
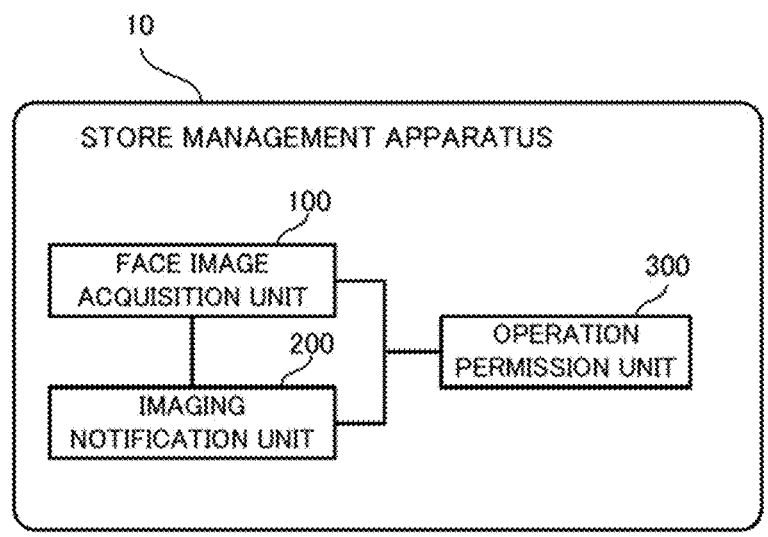
FIG. 3 is a block diagram illustrating functional blocks provided in the store management apparatus according to the first example embodiment.

Next, a configuration of the store management system 1 according to the first example embodiment will be described with reference to FIG. 2 and FIG. 3. FIG. 2 is a plan view illustrating an example of a store layout to which the store management system according to the first example embodiment is applied. FIG. 3 is a block diagram illustrating functional blocks provided in the store management apparatus according to the first example embodiment.

As illustrated in FIG. 2, the store management system 1 according to the first example embodiment is applied to a store such as, for example, a convenience store. The store management system 1 includes a store management apparatus 10 configured as a store management server that controls an entire system, a camera 20a and a tablet 30a installed at a store entrance side, a camera 20b and a checkout terminal 40 installed near a checkout counter, and a camera 20c and a tablet 30b installed at a store exit side.

As illustrated in FIG. 3, the store management apparatus 10 includes a face image acquisition unit 100, an imaging notification unit 200, and an operation permission unit 300. These functional blocks are implemented, for example, in the CPU 11 (see FIG. 1).

The face image acquisition unit 100 is connected to at least one of the cameras 20 (i.e., cameras 20a, 20b, and 20c in FIG. 2) disposed, for example, in the store. Each camera 20 is configured to capture a user's face image, and the face image acquisition unit 100 is configured to obtain the image (i.e., the user's face image) captured by each camera 20. More specifically, the face image acquisition unit 100 is configured to obtain the face image of a user who intends to enter the store, from the camera 20a installed near the store entrance, when the user tries to enter the store. The face image acquisition unit 100 is configured to obtain the face image of a user who intends to make payment, from the camera 20b installed near the checkout terminal 40, when the user tries to make payment at the store. The face image acquisition unit 100 is configured to obtain the face image of a user who intends to leave the store, from the camera 20c installed near the store exit, when the user tries to leave the store. The user's face image obtained by the face image acquisition unit 100 is stored, for example, in the storage apparatus 14 included in the store management system 1. The face image acquisition unit 100 is a specific example of the "acquisition unit" in Supplementary Note described later.

The imaging notification unit 200 is connected, for example, to the tablets 30 (i.e., the tablets 30a and 30b in FIG. 2), the checkout terminal 40, or any other HMI (Human Machine Interface) disposed in the store, and is configured to notify the user that the user's face image is to be captured or is captured by the cameras 20 (that is, the user's face image is to be obtained or is obtained by the face image acquisition unit 100). More specifically, the imaging notification unit 200 is configured to notify the user who intends to enter the store that the face image is to be captured or is captured by the camera 20*a*, via the tablet 30*a* installed near the store entrance. The imaging notification unit 200 is configured to notify the user who intends to make payment at the store that the face image is to be captured or is captured by the camera 20*b*, via the checkout terminal 40. The imaging notification unit 200 is configured to notify the user who intends to leave the store that the face image is to be captured or is captured by the camera 20*c*, via the tablet 30*b* installed near the store exit. For example, the imaging notification unit 200 displays a predetermined image (e.g., an image of a sentence indicating that the face image is to be captured or is captured) on the screen of a display provided in the tablets 30 or the checkout terminal 40, thereby to notify the user that the face image is to be captured or is captured. Alternatively, the imaging notification unit 200 outputs a predetermined audio (e.g., audio for announcing that the face image is to be captured or is captured) from a speaker, thereby notify the user that the face image is to be captured or is captured. The notification by the imaging notification unit 200 may be any notification as long as it allows the user to recognize that the face image is to be captured. It may not only directly notify the user that the face image is to be captured, but also may imply the same. The imaging notification unit 200 is a specific example of the "notification unit" in Supplementary Note described later.

The operation permission unit 300 is configured to permit the user at least one of to enter the store, to make payment, and to leave the store (specifically, the operation that the user intends to perform when the face image is captured), on condition that the user's face image is obtained by the face image acquisition unit 100 and that the user is notified of the imaging by the imaging notification unit 200. The operation permission unit 300, for example, controls the opening and closing of an automatic door 50 at the store entrance, thereby to permit the user to enter or leave the store. Furthermore, the operation permission unit 300, for example, controls the operation of the checkout terminal 40 of the store, thereby to permit the user to make payment. The operation permission unit 300 is a specific example of the "permission unit" in Supplementary Note described later.

(Explanation of Operation)

Figure 4:
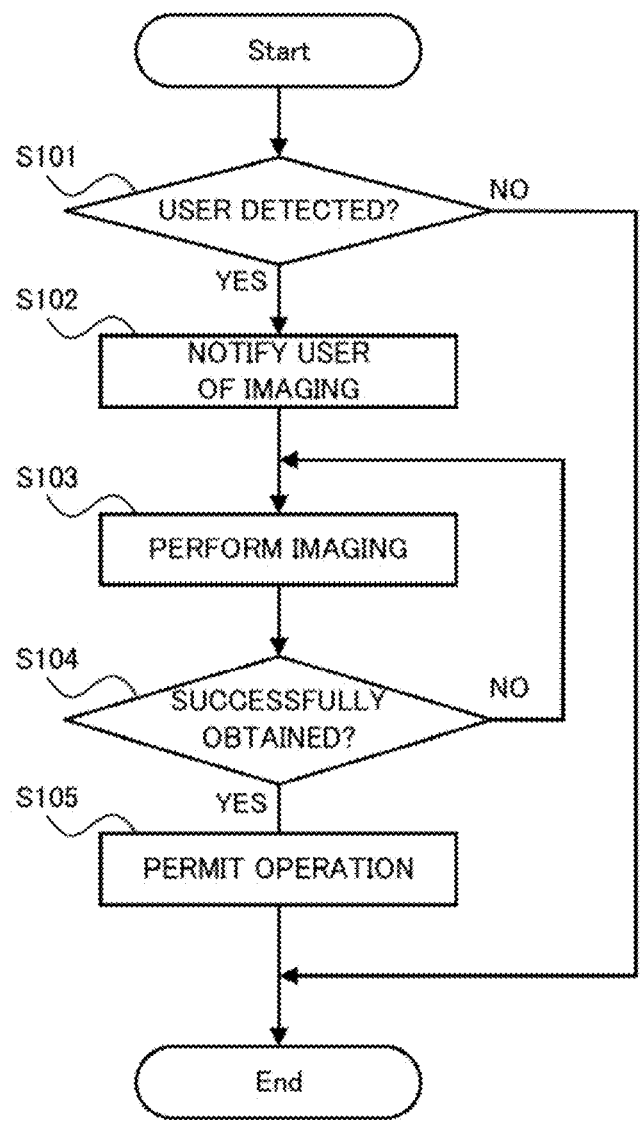
FIG. 4 is a flowchart illustrating a flow of the operation of the store management system according to the first example embodiment.

Next, a flow of the operation of the store management system 1 according to the first example embodiment will be described with reference to FIG. 4. FIG. 4 is a flowchart illustrating the flow of the operation of the store management system according to the first example embodiment.

As illustrated in FIG. 4, the store management system 1 according to the first example embodiment firstly detects the presence of a user who intends to enter the store, to make payment, or to leave the store (step S101). The presence of such a user may be detected, for example, by using a sensor or the like installed near the store entrance or exit or near the checkout counter or cashier. Alternatively, the presence of the user may be detected by the user operating a terminal. When the presence of a user is not detected (the step S101: NO), no further processing is performed. In this case, the S101 may be started after a predetermined period of time.

When the presence of the user is detected (the step S101: YES), the imaging notification unit 200 notifies the user that the user's face image is to be captured (step S102). That is, the flowchart illustrated in FIG. 4 indicates the operation of the imaging notification unit 200 notifying the user that the face image is to be captured, before the face image is actually captured. A notification given to the user may include an instruction to adjust the user's standing position (e.g., to move in an imaging range of the camera 20) and an instruction to face to the camera 20 such that the user's face image can be successfully captured.

Then, the user is imaged by the camera 20, and the face image acquisition unit 100 obtains the user's face image (step S103). A timing of capturing the face image may be determined by the user (e.g., the imaging may be performed at a timing at which the user operates a button). Furthermore, the captured face image may be displayed on the tablets 30, the checkout terminal 40, or the like, such that the user can confirm the image. If the imaging notification unit 200 notifies the user not that the face image is to be captured from now, but that the face image is already captured, then, the step S103 may be firstly performed before the step S102.

Then, the face image acquisition unit 100 confirms whether or not the face image is successfully obtained (step S104). For example, the face image acquisition unit 100 determines whether or not the captured face image is sufficient enough to be correctly recognized as a human face. When it is determined that the face image is not successfully obtained (the step S104: NO), the user is imaged again by the camera, and acquisition of the face image is attempted again by the face image acquisition unit 100 (the step S103). If the face image cannot be successfully obtained even though the imaging is performed a predetermined number of times or more, then, an instruction may be outputted to expose the user's face to the camera (e.g., requesting the user to take off sunglasses or a mask).

When it is determined that the face image is successfully obtained (the step S104: NO), the operation permission unit 300 permits the user whose face image is captured, to enter the store, to make payment, or to leave the store (step S105). The operation permission unit 300 may notify the user of the permission to enter the store, to make payment, or to leave the store.

(Technical Effects)

Next, technical effects obtained by the store management system 1 according to the first example embodiment will be described.

As described in FIG. 1 to FIG. 4, according to the store management system 1 in the first example embodiment, the user whose face image is captured, is permitted to enter the store, to make payment, and leave the store (in other words, the user is permitted to use the store). On the other hand, the user whose face image is not captured, is not permitted to enter the store, to make payment, and leave the store (in other words, the user is not permitted to use the store). It is thus possible to enhance security in the store (especially an unmanned store at night, etc.) by obtaining the user's face image in advance and then permitting the use of the store. Specifically, the security can be more enhanced, compared to when anyone can freely use the store.

Furthermore, especially in the first example embodiment, since the user is notified that the face image is to be captured in advance or that the face image is already captured before the user is permitted to enter the store, to make payment, and leave the store, the user is surely aware that the store side recognizes the user's presence. For example, the user recognizes that the face image should be used to identify an individual. It is therefore possible to effectively prevent the user from taking inappropriate actions at the store.

In the first example embodiment, the face image is captured, but collation with the face image registered in advance (so-called face authentication) is not performed. Therefore, it is possible to appropriately permit the user to use the store without forcing the user to take a member registration procedure before visiting (specifically, a work of linking the face image with a user account) or the like.

Second Example Embodiment

Next, the store management system 1 according to a second example embodiment will be described with reference to FIG. 5 and FIG. 6. The second example embodiment is partially different from the first example embodiment described above in configuration and operation, and is substantially the same in the other parts. Therefore, the parts that differ from those of the first example embodiment will be described in detail below, and an explanation of the other overlapping parts will be omitted as occasion demands.
(System Configuration)

Firstly, the configuration of functional blocks provided in the store management apparatus 10 according to the second example embodiment will be described with reference to FIG. 5. FIG. 5 is a block diagram illustrating the functional blocks provided by the store management apparatus according to the second example embodiment.

Figure 5:
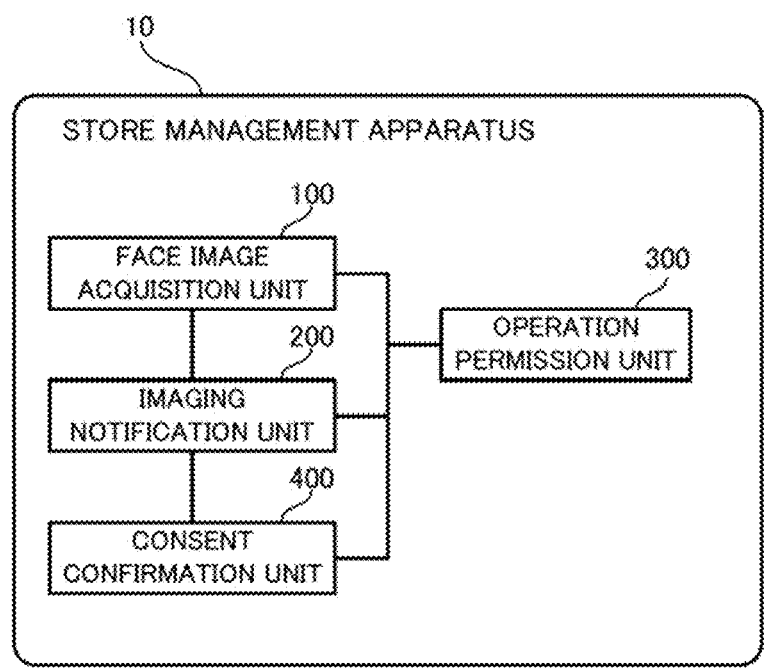
FIG. 5 is a block diagram illustrating functional blocks provided in a store management apparatus according to a second example embodiment.

As illustrated in FIG. 5, the store management apparatus 10 according to the second example embodiment further includes a consent confirmation unit 400, in addition to the functional blocks of the first example embodiment illustrated in FIG. 3.

The consent confirmation unit 400 is configured to confirm whether the user consents to a notification given by the imaging notification unit 200 (i.e., a notification indicating that the face image is to be captured or is captured). The consent confirmation unit 400 determines that the user's consent is obtained, for example, by the user operating the terminal such as the tablets 30 and the checkout terminal 40. Alternatively, the consent confirmation unit 400 may determine that the user's consent is obtained, for example, when the user performs such an operation (typically, a gesture) that the user consents to the imaging. Alternatively, when the user does not perform an operation of refusing the imaging with respect to the notification given by the imaging notification unit 200, it may be determined that the user's consent is obtained. When it is determined that the user's consent is obtained on the basis of such a user's operation, the consent confirmation unit 400 may determine what the user's operation is like, via the cameras 20 (or any sensor that is configured to detect the user's operation). Furthermore, the consent confirmation unit 400 may provide the user with a display based on the personal information protection law (e.g., a display indicating that the captured face image is used only for processing to permit the user to enter the store, to make payment, and to leave the store). The consent confirmation unit 400 is a specific example of the "determination unit" in Supplementary Note described later.
(Explanation of Operation)

Next, a flow of the operation of the store management system 1 according to the second example embodiment will be described with reference to FIG. 6. FIG. 6 is a flowchart illustrating a flow of the operation of the store management system according to the second example embodiment.

Figure 6:
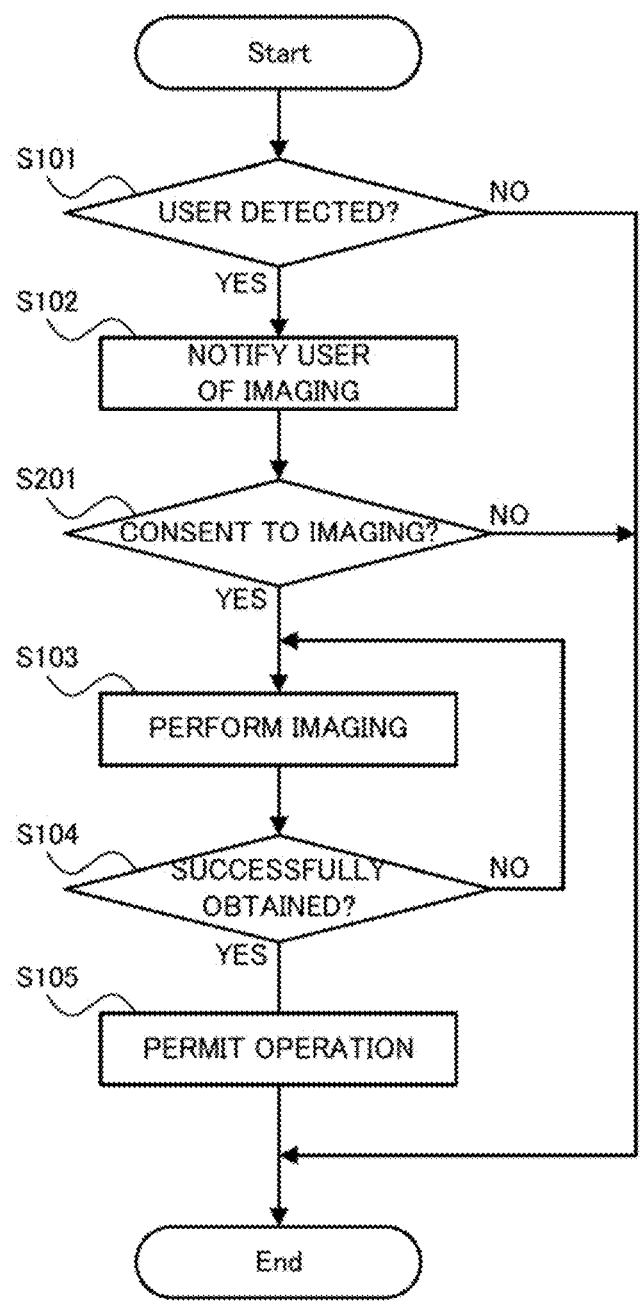
FIG. 6 is a flowchart illustrating a flow of the operation of the store management system according to the second example embodiment.

As illustrated in FIG. 6, in operation of the store management system 1 according to the second example embodiment, after the user is notified by the imaging notification unit 200 (the step S102), the consent confirmation unit 400 determines whether or not there is a user's consent to the notification (step S201).

When it is determined that there is a user's consent (the step S201: YES), the process after the step S103 is performed in the same manner as in the first example embodiment (i.e., the user is permitted to use the store as occasion demands). On the other hand, when it is determined that there is no user's consent (the step S201: NO), the process after the step S103 is not performed (i.e., the user is not permitted to use the store).
(Technical Effects)

Next, technical effects obtained by the store management system 1 according to the second example embodiment will be described.

As described in FIG. 5 and FIG. 6, according to the store management system 1 in the second example embodiment, only the user who consents to the imaging/capturing of the face image is permitted to use the store (i.e., to enter the store, to make payment, and to leave the store) as occasion demands. Therefore, it is possible to avoid a situation in which the user who refuses the imaging/capturing of the face image can use the store. Furthermore, it is possible to reliably prevent that the face image is used on the store side without obtaining the user's consent.

Third Example Embodiment

Next, the store management system 1 according to a third example embodiment will be described with reference to FIG. 7 and FIG. 8. The third example embodiment is partially different from the first and second example embodiments described above in configuration and operation, and is substantially the same in the other parts. Therefore, the parts that differ from those of the first and second example embodiment will be described in detail below, and an explanation of the other overlapping parts will be omitted as occasion demands.
(System Configuration)

Firstly, the configuration of functional blocks provided in the store management apparatus 10 according to the third example embodiment will be described with reference to FIG. 7. FIG. 7 is a block diagram illustrating the functional blocks provided by the store management apparatus according to the third example embodiment.

Figure 7:
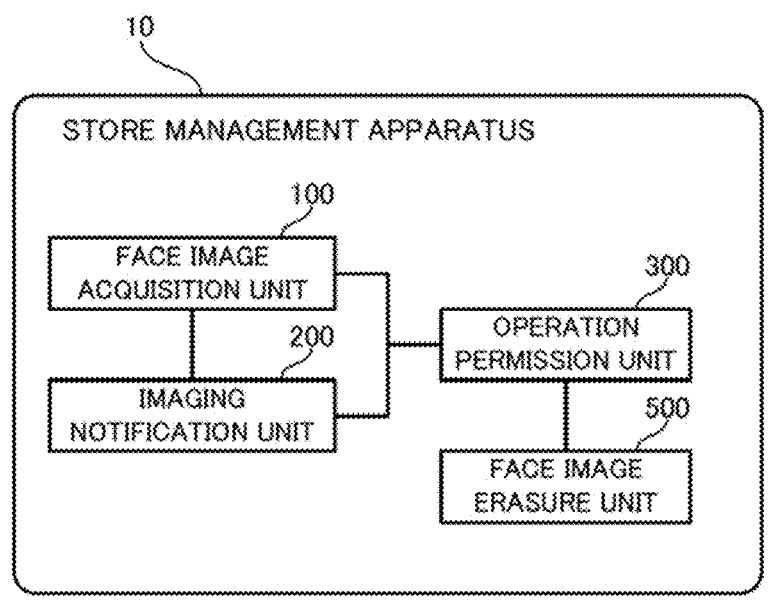
FIG. 7 is a block diagram illustrating functional blocks provided in a store management apparatus according to a third example embodiment.

As illustrated in FIG. 7, the store management apparatus 10 according to the third example embodiment further includes a face image erasure unit 500, in addition to the functional blocks of the first example embodiment illustrated in FIG. 2.

The face image erasure unit 500 is configured to erase the face image obtained by the face image acquisition unit 100 (in other words, to delete face image data of the user that is stored so far) when a deletion trigger is detected with respect to the user who is permitted to enter the store, to make payment, to leave the store. The "deletion trigger" is set in advance as a condition for determining whether or not to erase the stored face images, and it is sufficient to set a condition that allows the determination of a timing at which the face image is no longer required (specifically, a timing at which the face image is no longer used to permit the user to enter the store, to make payment, and to leave the store). An example of the deletion trigger includes such conditions as "the user leaves the store" and "a certain time has elapsed since the user entered the store". When the user's leaving the store is used as the deletion trigger, a timing at which the face image erasure unit 500 erases the face image may be immediately after the user leaves the store, or may be a certain time after the user leaves the store. The face image erasure unit 500 may determine that the user leaves, when the user is permitted to leave the store by the operation permission unit 300. In addition, if it can be determined that the user has left the store for sure (e.g., when an extremely long time has elapsed since the visit) even when the user's leaving the store is not directly detected, then, it may be determined that the user has already left the store and the face image may be erased. The face image erasure unit 500 is a specific example of the "erasure unit" in Supplementary Note described below.

(Explanation of Operation)

Next, a flow of the operation of the store management system 1 according to a third example embodiment will be described with reference to FIG. 8. FIG. 8 is a flowchart illustrating a flow of the operation of the store management system according to the third example embodiment.

Figure 8:
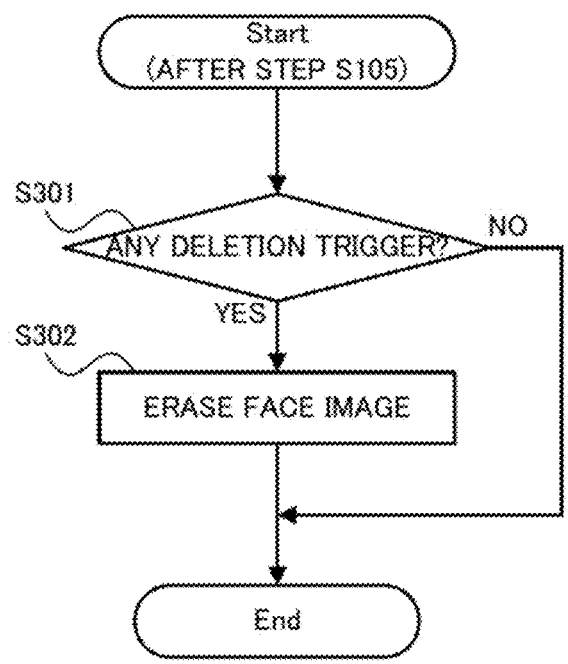
FIG. 8 is a flowchart illustrating a flow of the operation of the store management system according to the third example embodiment.

As illustrated in FIG. 8, in operation of the store management system 1 according to the third example embodiment, after the operation permission unit 300 permits the user to enter the store, to make payment, and to leave the store (the step S105), the face image erasure unit 500 determines whether or not the deletion trigger is detected (step S301). When it is determined that the deletion trigger is not detected (the step S301: NO), a series of operations is ended without deleting the face image. In this case, the step S301 may be performed again after a predetermined period of time.

When it is determined that the deletion trigger is detected (the step S301: YES), the face image erasure unit 500 erases the user's face image in which the deletion trigger is detected (step S302). Therefore, the store management system 1 according to the third example embodiment is in a condition in which the user's face image is not stored after the deletion trigger is detected. In other words, the store management system 1 according to the third example embodiment is configured to store only the user's face image in which the deletion trigger is not detected.

(Technical Effects)

Next, technical effects obtained by the store management system 1 according to the third example embodiment will be described.

As described in FIG. 7 and FIG. 8, according to the store management system 1 in the third example embodiment, since the user's face image in which the deletion trigger is detected is erased, for example, even when the same user visits the store again, a new face image is obtained at each time. Therefore, it is not necessary for the store management system 1 to store an enormous number of face image data. Furthermore, it is also possible to properly manage the face images as personal information.

Modified Example

Next, a modified example of the store management system 1 according to the first to third example embodiments described above will be described.

As already described, the store management system 1 according to the first to third example embodiments permits the user to use the store on condition that the user's face image is captured and that the user is notified, and does not require the collation of the face image (so-called "face authentication"). However, in addition to these operations, the face image once obtained may be used to perform the user's face authentication. For example, at the time of making payment, it may be determined whether or not the face image of the user captured when entering the store matches the face image of the user who intends to make payment. Similarly, at the time of leaving the store, it may be determined whether or not the face image of the user captured when entering the store or when making payment matches the face image of the user who intends to leave the store. In the case of performing the face authentication, the face authentication can be more suitably performed by employing the configuration in which the face image is erased (i.e., is captured at each time) as in the third example embodiment described above. For example, it is possible to avoid a situation in which the face image captured during the daytime cannot be used for the face authentication at night, or conversely, a situation in which the face image captured at night cannot be used for the face authentication during the daytime, due to a difference in brightness when the face image is captured. Furthermore, since the latest face image can be always used and an unnecessary face image can be deleted (in other words, the face image to be collated can be limited), it is possible to improve the accuracy of the face authentication.

In addition, the collation may be performed only with the face image of the user who should not be permitted to enter the store (e.g., a list of face images of people on a black list) stored in advance may be collated, and the user may not be permitted to enter the store, to make payment, and to leave the store when the face images match. In this case, a back room or an operation center may be notified of the arrival of the user stored in advance. Alternatively, an intercom or the like may be used by a person at the store side to manually permit the user to use the store.

In addition, the images captured at the time of entering the store, making payment, and leaving the store may be linked with customer information, such as when the user enters, what the user buys, and when the user leaves, and it may be set easily browsable.

Furthermore, if the user's making payment or leaving the store is not detected even a predetermined time (e.g., about 10 minutes) after entering the store, the backroom or operation center may be notified and requested to confirm the store interior.

In addition, it is possible to switch between a mode in which the user is permitted to enter the store, to make payment, and to leave the store by capturing the face image (i.e., a mode in which the operation described in the first to third example embodiments is performed) and a mode in which anyone freely enters the store, makes payment, and leaves the store, as occasion demands. In this case, the mode may be switched by the operation of a clerk, or the mode may be switched automatically depending on time (e.g., a time when an unmanned/unattended business is started).

Supplementary Notes

With respect to the example embodiments described above, the following Supplementary Notes will be further disclosed.

(Supplementary Note 1)

A store management system described in Supplementary Note 1 is a store management system including: an acquisition unit that obtains a face image of a customer from an imaging apparatus that captures the face image of the customer at a timing at which the customer intends at least one of to enter a store, to make payment, and to leave the store; a notification unit that notifies the customer that the face image is to be obtained or is obtained by the acquisition unit; and a permission unit that permits the customer at least one of to enter the store, to make payment, and to leave the store on condition that the face image is obtained by the acquisition unit and that the customer is notified by the notification unit.

(Supplementary Note 2)

A store management system described in Supplementary Note 2 is the store management system described in Supplementary Note 1, wherein the permission unit permits the customer at least one of to enter the store, to make payment, and to leave the store, without determining whether or not the face image obtained by the acquisition unit matches that of the customer obtained in advance.

(Supplementary Note 3)

A store management system described in Supplementary Note 3 is the store management system described in Supplementary Note 1 or 2, wherein the notification unit displays a predetermined image to the customer or outputs a predetermined audio to the customer, thereby to notify the customer that the face image is to be obtained or is obtained.

(Supplementary Note 4)

A store management system described in Supplementary Note 4 is the store management system described in any one of Supplementary Notes 1 to 3, further including a determination unit that determines that the customer consents to a notification given by the notification unit, wherein the permission unit permits the customer at least one of to enter the store, to make payment, and to leave the store on condition that it is determined by the determination unit that the customer consents, in addition to the condition that the face image is obtained by the acquisition unit and that the customer is notified by the notification unit.

(Supplementary Note 5)

A store management system described in Supplementary Note 5 is the store management system described in Supplementary Note 4, wherein the determination unit determines that the customer consents to the notification given by the notification unit, when the customer takes a predetermined action after being notified by the notification unit.

(Supplementary Note 6)

A store management system described in Supplementary Note 6 is the store management system described in any one of Supplementary Notes 1 to 5, further including an erasure unit that erases the face image of the customer obtained by the acquisition unit, when a deletion trigger about the customer is detected.

(Supplementary Note 7)

A store management method described in Supplementary Note 7 is a store management method including: an acquisition step that obtains a face image of a customer from an imaging apparatus that captures the face image of the customer at a timing at which the customer intends at least one of to enter a store, to make payment, and to leave the store; a notification step that notifies the customer that the face image is to be obtained or is obtained by the acquisition step; and a permission step that permits the customer at least one of to enter the store, to make payment, and to leave the store on condition that the face image is obtained by the acquisition step and that the customer is notified by the notification step.

(Supplementary Note 8)

A computer program described in Supplementary Note 8 is a computer program that allows a computer to execute: an acquisition step that obtains a face image of a customer from an imaging apparatus that captures the face image of the customer at a timing at which the customer intends at least one of to enter a store, to make payment, and to leave the store; a notification step that notifies the customer that the face image is to be obtained or is obtained by the acquisition step; and a permission step that permits the customer at least one of to enter the store, to make payment, and to leave the store on condition that the face image is obtained by the acquisition step and that the customer is notified by the notification step.

(Supplementary Note 9)

A recording medium described in Supplementary Note 9 is a recording medium on which the computer program described in Supplementary Note 8 is recorded.

The present invention is not limited to the examples described above and is allowed to be changed, if desired, without departing from the essence or spirit of the invention which can be read from the claims and the entire specification. A store management system, a store management method, a computer program and a recording medium with such changes are also intended to be within the technical scope of the present invention.

To the extent permitted by law, this application is based upon and claims the benefit of priority from Japanese Patent Application No. 2019-113479, filed Jun. 19, 2019, and incorporates all of its disclosure herein. Also, to the extent permitted by law, all the publications and articles described in the description are incorporated herein by reference.

DESCRIPTION OF REFERENCE CODES

1 Store management system
10 Store management apparatus
11 CPU
15 Input apparatus
16 Output apparatus
20 Camera
30 Tablet
40 Checkout terminal
50 Automatic door
100 Face image acquisition unit
200 Imaging notification unit
300 Operation permission unit
400 Consent confirmation unit
500 Face image erasure unit

What is claimed is:

1. A store management system comprising:
at least one memory storing instructions; and
at least one processor configured to execute the instructions to:
obtain a face image of a customer from an imaging apparatus that captures the face image of the customer at a timing at which the customer intends at least one of to enter a store, to make payment, and to leave the store;
after the face image that is capable of being correctly recognized as a human face has been successfully obtained, notify the customer that the face image has been obtained; and
based on the face image being successfully obtained being notified, permit the customer to make payment without performing face authentication operation to determine whether or not the face image that has been obtained matches that of the customer obtained in advance.

2. The store management system according to claim 1, wherein the at least one processor is configured to execute the instructions to display a predetermined image to the customer or to output a predetermined audio to the customer, to notify the customer that the face image has been obtained.

3. The store management system according to claim 1, wherein the at least one processor is configured to execute the instructions to determine that the customer consents to a notification given to the customer; and permit the customer at least one of to enter the store, to make payment, and to leave the store on condition that it is determined that the customer has consented to the notification, in addition to the face image having been obtained and the customer having been notified.

4. The store management system according to claim 3, wherein the at least one processor is configured to execute the instructions to determine that the customer consents to the notification when the customer takes a predetermined action after being notified.

5. The store management system according to claim 1, wherein the at least one processor is configured to execute the instructions to erase the face image of the customer that has been obtained when a deletion trigger about the customer is detected.

6. A store management method performed by a computer and comprising:

obtaining a face image of a customer from an imaging apparatus that captures the face image of the customer at a timing at which the customer intends at least one of to enter a store, to make payment, and to leave the store;

after the face image that is capable of being correctly recognized as a human face has been successfully obtained, notifying the customer that the face image has been obtained; and based on the face image being successfully obtained being notified, permitting the customer to make payment without performing face authentication operation to determine whether or not the face image that has been obtained matches that of the customer obtained in advance.

7. A non-transitory program recording medium storing a computer program executable by a computer to perform a store management method comprising:

obtaining a face image of a customer from an imaging apparatus that captures the face image of the customer at a timing at which the customer intends at least one of to enter a store, to make payment, and to leave the store;

after the face image that is capable of being correctly recognized as a human face has been successfully obtained, notifying the customer that the face image has been obtained; and based on the face image being successfully obtained being notified, permitting the customer to make payment without performing face authentication operation to determine whether or not the face image that has been obtained matches that of the customer obtained in advance.

* * * * *